(12) United States Patent
Rytz et al.

(10) Patent No.: US 8,300,305 B2
(45) Date of Patent: Oct. 30, 2012

(54) USE OF UNDOPED CRYSTALS OF THE YTTRIUM/ALUMINUM/BORATE FAMILY FOR CREATING NON-LINEAR EFFECTS

(75) Inventors: Daniel Rytz, Herborn (DE); Andreas Gross, Burbacherstr (DE); Sophie Vernay, Oberhambach (DE); Volker Wesemann, Idar-Oberstein (DE)

(73) Assignee: Forschungsinstitut fur Mineralische und Metallische Werkstoffe Edelstein/Edelmetalle GmbH, Idar-Oberstein (DE)

( * ) Notice: Subject to any disclaimer, the term of this patent is extended or adjusted under 35 U.S.C. 154(b) by 0 days.

(21) Appl. No.: 13/205,577

(22) Filed: Aug. 8, 2011

(65) Prior Publication Data

US 2012/0033292 A1 Feb. 9, 2012

Related U.S. Application Data

(63) Continuation of application No. 12/602,832, filed as application No. PCT/EP2008/056035 on May 16, 2008, now abandoned.

(30) Foreign Application Priority Data

Jun. 19, 2007 (DE) .......................... 10 2007 028 610

(51) Int. Cl.
*G02F 2/02* (2006.01)
*G02F 1/35* (2006.01)

(52) U.S. Cl. .......................................... 359/328; 372/22

(58) Field of Classification Search .......... 359/326–332; 385/122; 252/301.4 R; 372/21–22
See application file for complete search history.

(56) References Cited

U.S. PATENT DOCUMENTS

| 5,030,851 | A | 7/1991 | Unternahrer | |
|---|---|---|---|---|
| 5,222,088 | A | 6/1993 | Amano | |
| 5,633,883 | A | 5/1997 | Shi et al. | |
| 7,534,377 | B2 * | 5/2009 | Keszler et al. | 252/584 |
| 7,848,012 | B2 | 12/2010 | Foster et al. | |
| 2006/0054864 | A1 * | 3/2006 | Alekel et al. | 252/301.4 R |
| 2007/0211773 | A1 | 9/2007 | Gerstenberger et al. | |

FOREIGN PATENT DOCUMENTS

| JP | 06216453 A | 8/1994 |
|---|---|---|
| WO | 94/29937 | 12/1994 |

OTHER PUBLICATIONS

A. Brenier et al, "Red-green-blue generation from a lone dual-wavelenght GdAl3 (BO3)4:Nd3 + laser" vol. 84,No. 12, Applied Physics Letters, Mar. 22, 2004, pp. 2034-2036.

(Continued)

*Primary Examiner* — Daniel Petkovsek
(74) *Attorney, Agent, or Firm* — Paul & Paul

(57) ABSTRACT

Crystals of the yttrium/aluminium/borate family are used for producing UV light. To produce UV light with the described crystal family a crystal of the family $A_xM_{1-x}X_3(BO_3)_4$, wherein both A and also M stand for an element from the group Y, La, Ce, Pr, Nd, Pm, Sm, Eu, Gd, Tb, Dy, Ho, Er, Tm, Yb and Lu, A≠M and X is selected from the group consisting of Al, Ga, Sc and $0 \leq x \leq 1$, is used as a non-linear optical element to produce light of a wavelength of less than 0.450 μm.

3 Claims, 1 Drawing Sheet

X, Y, Z: primary optical axes
k is the propagation direction

OTHER PUBLICATIONS

A. Brenier et al, "Self-frequency tripling from two cascaded second-order nonlinearties in GdAl3(BO3)4:Nd3+" vol. 84, No. 1, pp. 16-18, Jan. 5, 2004.

J. Bartschke et al., "Diode-pumped passively Q-switched self-frequency-doubling Nd:YAB laser", J. Opt Soc. Am B/vol. 14, No. 12, pp. 3452-3456, Dec. 1997. General Physics Institute of Russian Academy of Sciences, Moscow Russia.

A. Brenier et al., "Spectroscopic properties, self-frequency doubling, and self-sum frequency mixing in GdAl3 (BO3)4:Nd3+", J Opt. Soc. Am. B/vol. 18, No. 8, Aug. 2001 pp. 1104-1110, China.

A. Brenier et al.,"Self-sum-and-difference-frequency mixing in GdAl3(BO3)4:Nd3+ for generation of tunable ultraviolet and infrared radiation" Optic Letters, vol. 27, No. 4, Feb. 15, 2002, pp. 240-242, China.

A. Brenier et al.,"Self-frequency tripling from two cascaded second-order nonlinearities in GdAl3(BO3)4:Nd3+", vol. 84, No. 1, pp. 16-18, Jan. 5, 2004, China.

P. Dekker et al., "Widely tunable yellow-green lasers based on the self frequency-doubling material yb:YAB", J. Opt. Soc. Am. B, vol. 20., No. 4, Apr. (2003) pp. 706-712, China.

P. Dekker et al., "Characterisation of nonlinear conversion and crystal quality in Nd- and Yb-doped YAB", vol. 12, No. 24., Optics Express, Nov. 29, 2004, pp. 5922-5930, Australia.

L.M. Dorozhkin et al., "Optical second-harmonic generation in a new nonlinear active medium: neodymium-yttrium-aluminum borate crystals", (1982), American Institute of Physics, pp. 555-556.

L.M. Dorozhkin et al., "Nonlinear optical properties of neodymium yttrium aluminum borate crystals", (1983) American Institute of Physics, US, pp. 978-980.

D. Eimerl et al., "Optical, mechanical, and thermal properties of barium borate", (1987) J. Appl. Phys., US, pp. 1968-1983.

Y.X. Fan et al., "Spectroscopic and Nonlinear Optical Properties of a Self-frequency-doubling NYAB Crystal", (1992), Technical Digest, New Mexico, pp. 311-313.

David C. Gerstenberger et al., "Noncritically phase-matched second-harmonic generation in cesium lithium borate", Optics Letters, vol. 28., No. 14, Jul. 15, 2003, Optical Society of America, pp. 1242-1244.

Ming-Yi Hwang et al, "Temperature dependence of second harmonic generation in NYAB crystals" Optics Communications 95, (1993) pp. 103-108, North Holland.

D. Jaque et al.,"Continuous-wave laser properties of the self- frequency-doubling YAl3(BO3)4:Nd crystal", 1998 Optical Society of America, vol. 15., No. 6, pp. 1656-1662.

D. Jaque et al., "Blue-light laser source by sum-frequency mixing in Nd:YAl3(BO3)4", 1998 Optical Society of America, vol. 73, No. 25, pp. 3659-3661.

D. Jaque et al., "Continuous wave laser radiation at 669 nm from a self-frequency-doubled laser of YAl3(BO3)4: Nd3+", 1999 American Institute if Physics, vol. 74., No. 13, pp. 1788-1790.

D. Jaque et al., "Red, green, and blue laser light from a single Nd:YAl3(BO3)4 crystal based on laser oscillation at 1.3 um", 1999 American Institute of Physics, vol. 75, No. 3, pp. 325-327.

Lu et al., "Excited Emission and Self-Frequency-Doubling Effect of NdxY1-Al3(BO3)4 Crystal", Chinese Physics Letters 1986, ISSN: 0256-307X, CN: 11-1959/0.4. Received Online, one page.

Lu et al."Laser self-doubling in neodymium yttrium aluminum borate", 1999 American Institute of Physics., vol. 66, No. 12, pp. 6052-6054.

Z.D. Luo et al., "Features and Applications of a New Self-Frequency-Doubling Laser Crystal—NYAB", SPIE vol. 1104, (1989), pp. 132-141, US.

M. Peltz et al., "Harmonic generation in bismuth triborate (BiB306)", Appl. Phys. B (2005), pp. 1-9, Germany.

I. Schutz et al., "Minature Self-Frequency-Doubling Cw Nd:Yab Laser Pumped by a Diode Laser", vol. 77, No. 2.3, pp. 221-225, (1990), Germany.

Chaoyang Tu, et al., "The Study of a self-frequency-doubling laser crystal Nd3+:GdAl3(BO3)4", Journal of Crystal Growth 208, (2000), pp. 487-492, China.

Daniel Rytz et al., YAl3(B03)4: "A novel NLO crystal for frequency conversion to UV wavelengths", The International Society for Optical Engineering—Solid State Lasers and Amplifiers III, Proc. of SPIE vol. 6998, 699814 , (2008) US.

* cited by examiner

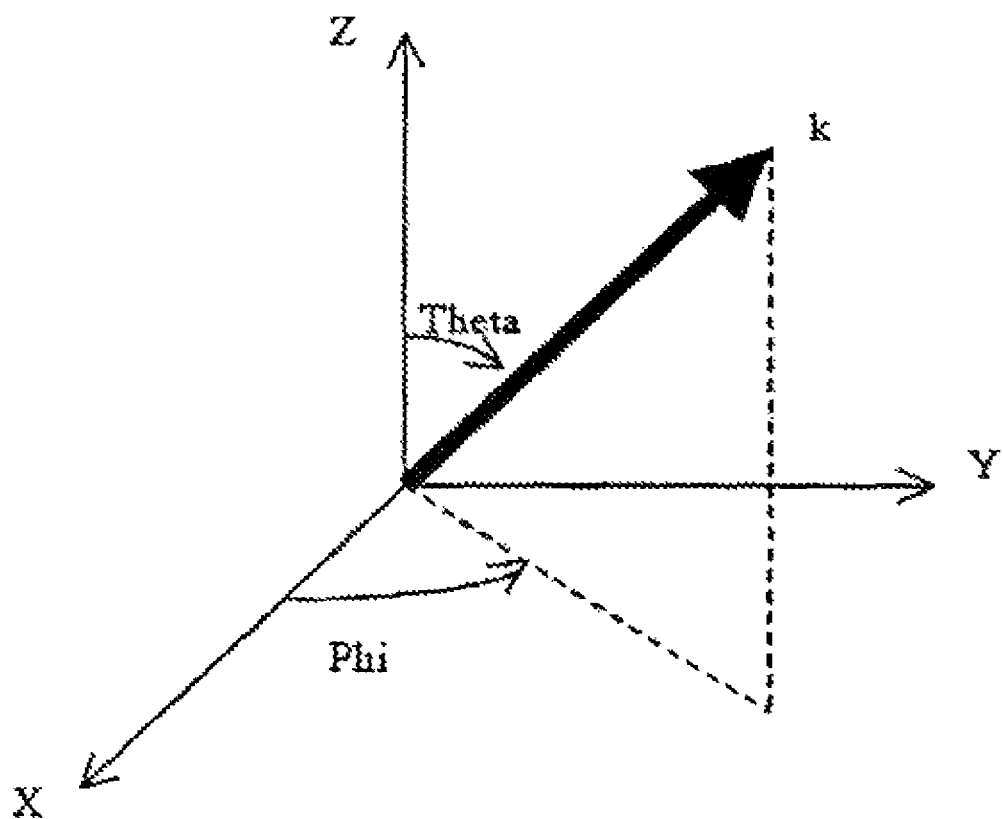
X, Y, Z: primary optical axes
k is the propagation direction

USE OF UNDOPED CRYSTALS OF THE YTTRIUM/ALUMINUM/BORATE FAMILY FOR CREATING NON-LINEAR EFFECTS

CROSS-REFERENCE TO RELATED APPLICATIONS

This application is a continuation of Application Ser. No. 12/602,832, filed Dec. 3, 2009, which is the National Stage of International Application No. PCT/EP2008/056035, filed May 16, 2008, which claims the benefit of the priority of German Patent Application No. 10 2007 028 610.6, filed Jun. 19, 2007, all of which are incorporated herein by reference in their entirety.

FIELD OF THE INVENTION

The present invention concerns a method of producing coherent blue or ultraviolet light, the use of crystals of the yttrium/aluminum/borate family for producing coherent blue or ultraviolet light and crystals of the yttrium/aluminum/borate family which are especially adapted for producing coherent blue or ultraviolet light.

BACKGROUND OF THE INVENTION

Scientific And Technical Fundamentals

Solid-state lasers which produce laser light in the blue or UV range are important light sources for numerous applications in technical regions involving a high market potential such as for example micromachining, precision measurement engineering, semiconductor production, biotechnology, medical engineering, display and printing technologies and so forth.

The desired wavelengths for such applications are in the spectral range of shorter than 450 nm. UV wavelengths which can be produced by non-linear frequency conversion from common (so-called fundamental) wavelengths assume a particular place. Thus for example the wavelengths which can be produced by the $Nd^{3+}$ junctions in widely varying laser host crystals in the range of 1.047-1.080 μm: 0.349-0.360 μm (frequency tripling), 0.261-0.270 μm (quadrupling), 0.209-0.216 μm (quintupling). Further examples are based on fundamental wavelengths of $Yb^{3+}$ in the range of 0.980-1.100 μm (accordingly the ranges 0.326-0.366, 0.245-0.275 and 0.196-0.220 μm can be covered in a similar manner), $Pr^{3+}$ in the range of 0.490-0.730 μm (for the range of 0.245-0.365 μm by frequency doubling), and so forth. Fundamental wavelengths can be produced by numerous laser sources (for example diode-pumped solid-state lasers, diode lasers, fiber lasers) in the range which is of interest for the various frequency conversion options. Crystals with corresponding non-linear optical (NLO) properties then permit the desired frequency conversion. NLO crystals for a given application must fulfill the following general requirements:

phase-adaptable for the desired frequency conversion, transparent for the fundamental and converted wavelengths, low optical losses and high destruction threshold for operation as a light source, favorable properties for crystal growth and machining so that commercially useable NLO components can be produced, and sufficiently great effective non-linearity.

Known commercially useable NLO crystals which are suitable for frequency conversion into the blue or ultraviolet frequency spectrum are BBO ($BaB_2O_4$, β-barium borate), LBO ($LiB_3O_5$, lithium triborate), YCOB ($YCa_4O(BO_3)_3$, BiBO ($BiB_3O_6$, bismuth borate) and CLBO ($CsLiB_6O_{10}$).

BBO, LBO, YCOB and BiBO permit frequency tripling of the wavelength 1.064 μm. Those NLO crystals, by so-called sum frequency generation of two wavelengths (in the case described here 1.064 μm=λ and its second harmonic 0.532 μm=λ/2) permit the production of the third harmonic at 0.355 μm=λ/3. In the so-called type I the mixed wavelengths involve the same polarization while in the so-called type II they are orthogonally polarized.

Even if basically non-linear effects occur in the crystal their efficiency depends on further secondary conditions. Thus for high-efficiency SFG it is necessary for both the irradiated wave or waves and also the wave or waves produced in the crystal to constructively interfere. To achieve that phase adaptation must be effected, that is to say it is necessary to look for a propagation direction in the crystal, in respect of which both the energy and the pulse are obtained in frequency conversion. That is achieved if the propagation speeds of the waves in that direction are the same. The phase adaptation angles or orientation angles are defined in FIG. 1.

A detailed summary of NLO crystal data is to be found in the reference Nik 03. Supplemental information is to be found in Eim 87, Ger 03 and Pel 06. Those references also describe the chemical compositions and the substantial material properties.

BBO and CLBO can be used commercially as NLO crystals for frequency doubling (or SHG for second harmonic generation) of 0.532 μm. Frequency quadrupling of 1.064 μm is also to be understood as frequency doubling of 0.532 μm=λ to produce UV light at 0.266 μm=λ/2.

The commercially available NLO crystals which can be considered for the production of blue or UV laser sources have the following limitations in their areas of application:

BBO: the disadvantages of BBO are the moisture sensitivity of the material (therefore the surfaces are unstable and relatively difficult to polish and coat) and the disadvantageous angle acceptance and the "walk-off". The latter limit the focusability of the fundamental waves and the useable crystal lengths.

LBO: the disadvantages of LBO are the moisture sensitivity of the material and the lack of phase adaptability for short wavelengths (below 555 nm SHG is no longer possible).

YCOB: the disadvantages of YCOB and other members of this crystal family are the low non-linear coefficients and the lack of phase adaptability for short wavelengths (below 720 nm SHG is not possible).

CLBO: this crystal, due to extremely severe moisture sensitivity, raises problems which are difficult to insoluble in terms of crystal polishing. Therefore CLBO is used only in few cases.

BiBO: this material cannot be used for wavelengths below 290 nm because the transparency range of this material is limited. The destruction threshold at 355 nm is markedly too low for the desired areas of use. BiBO can only be used for special UV applications in a limited range. Important wavelengths such as for example 266 nm cannot be produced with BiBO.

$Nd_xY_{1-x}Al_3(BO_3)_4$ (abbreviated as NYAB), $Yb_xY_{1-x}Al_3(BO_3)_4$ (YbYAB) and $Nd_xGd_{1-x}Ga_3(BO_3)_4$ (NGAB) are known crystals of which it is known that they exhibit non-linear optical properties.

NYAB or NGAB which have self-doubling properties are in principle of less interest as the laser-active ions have additional unwanted optical absorption bands in the transmission range. Nonetheless they are of interest in some situations of use.

As an example here, the properties of YAB are described in greater detail and the state of the art analyzed.

Properties of Yttrium Aluminum Borate (YAB)

YAB crystals have the following features:
Structure And Material Parameters

| structure | trigonal, space group R32 |
|---|---|
| lattice constant | a = 9.287 Å |
| | c = 7.256 Å |
| density | 3.70 g/cm$^3$ |
| melting point | non-congruent |
| hardness | Mohs 7.5 |
| stability | non-hygroscopic |
| specific heat | 0.75 W s g$^{-1}$K$^{-1}$ |
| thermal conductivity | 3-4 W m$^{-1}$K$^{-1}$ |

Optical Parameters

| transmission | 160-2200 nm |
|---|---|
| refractive indices | $n_o$ = 1.7553 (at 1064 nm) |
| | $n_e$ = 1.6869 (at 1064 nm) |
| | uniaxially negative ($n_o > n_e$) |

The relatively great hardness of YAB crystals and their insensitivity in relation to air moisture must be emphasized here. Those two properties distinguish YAB crystals from many other borates such as BBO, LBO and CLBO. The latter crystals (see above) at the present time form the standards among the NLO materials for UV applications. YAB crystals afford marked advantages due to hardness and stability. Surface polishing of YAB crystals can be effected with conventional polishing procedures (using water). The surfaces can be cleaned with aqueous solvents. The application of surface treatments for controlling surface reflectivity by means of thin layer technology is similar in relation to YAB as to optical glasses (for example quartz glass) or oxidic crystals (for example $Y_3Al_5O_{12}$), that is to say very much simpler than in the case of hygroscopic materials such as BBO, LBO and CLBO.

The NLO properties which can be extrapolated for YAB from the literature are summarized in Table 1 for SHG and in Table 2 for SFG. With one exception that information involves data which were measured with self-doubling crystals of the type NYAB (=$Nd_xY_{1-x}Al_3(BO_3)_4$ with x=between 4 and 20%), NGAB (=$Nd_xGd_{1-x}Al_3(BO_3)_4$ with x=between 3 and 10%) or YbYAB (=$Yb_xY_{1-x}Al_3(BO_3)_4$ with x=between 5 and 10%). The exception is the reference Unt 91 which actually refers to an undoped "pure" YAB crystal. That reference is analyzed in detail hereinafter.

The listed data provide the following insights:

the values measured with NYAB, NGA or YbYAB for the ordinary and extraordinary refractive indices $n_o$ and $n_e$ originate from various works (Dor 81, Lu 89, Luo 89, Tu 00): the dispersion of the refractive indices is precisely known over a limited range of about: between 0.404 and 0.707 μm, beyond that extrapolation is required. Such extrapolation leads to severe deviations in the case of short UV and in the case of IR wavelengths.

The phase adaptation angles vary between 28.5 and 34.5° for SHG (1.064 mm) type I and between 41.0 and 51° for SHG type II. The scatter of those angle values is probably in part because of the differences in the refractive indices which formed the basis for calculation of the phase adaptation conditions.

the shortest wavelength produced with SHG and demonstrated is at 0.455 μm.

many experimental parameters (for example the NLO coefficients $d_{eff}$ or the angle acceptances) are known only in part and in fragmentary fashion. The angle dependency of $d_{eff}$ is not taken into consideration although ultimately it determines the efficiency of the NLO process.

TABLE 1

| λ μm | $n_o$ | $n_e$ | SHG λ/2 μm | $n_o$ | $n_e$ | Type I Angle ° | Type II Angle ° | Type I $d_{eff}$ pm/V | Type II $d_{eff}$ pm/V | Type I Angle acceptance mrad cm | Type II Angle acceptance mrad cm | Ref. |
|---|---|---|---|---|---|---|---|---|---|---|---|---|
| 0.910 | | | 0.455 | | | 34.0 | | | | | | Bar 97 |
| 1.064 | 1.762 | 1.693 | 0.532 | 1.7780 | 1.7037 | 30 | | | | | | Dor 81 |
| 1.064 | 1.765 | 1.694 | 0.532 | 1.786 | 1.710 | 30 | 43 | | | 0.66 | 1.01 | Dor 83 |
| 1.064 | 1.7553 | 1.6863 | 0.532 | 1.7808 | 1.7050 | 34.53 | 50.57 | | | | | Lu 89 |
| 1.064 | 1.7553 | 1.6869 | 0.532 | 1.7808 | 1.7075 | 32.9 | 51 | 1.43 | 0.67 | | | Luo 89 |
| 1.062 | 1.7617 | 1.6904 | 0.531 | 1.7795 | 1.7045 | 28.46 | 41.03 | | | | | Luo 89b |
| 1.064 | 1.7553 | 1.6869 | 0.532 | 1.7808 | 1.7075 | 32.9 | | 1.30 | | | | Sch 90 |
| 1.06 | | | 0.53 | | | 33 | | | | | | Unt 91 |
| 1.06 | 1.7613 | 1.6886 | 0.53 | 1.7819 | 1.7064 | 30.7 | 45.6 | 1.273 | 0.725 | | | Fan 92 |
| 1.064 | | | 0.532 | | | 32.9 | | | | 0.67 | | Hwa 93 |
| 1.062 | | | 0.531 | | | 30.7 | | | | | | Bar 97b |

TABLE 1-continued

| λ μm | $n_o$ | $n_e$ | SHG λ/2 μm | $n_o$ | $n_e$ | Type I Angle ° | Type II Angle ° | Type I $d_{eff}$ pm/V | Type II $d_{eff}$ pm/V | Type I Angle acceptance mrad cm | Type II Angle acceptance mrad cm | Ref. |
|---|---|---|---|---|---|---|---|---|---|---|---|---|
| 1.062 | | | 0.531 | | | 30.7 | | | | | | Jaq 98 |
| 1.016-1.090 | | | 0.508-0.545 | | | 31 | | | | 1.2-1.45 | | Dek 03 Dek 04 |
| 1.318 | 1.762 | 1.693 | 0.659 | 1.778 | 1.704 | 27 | 36 | | | 0.99 | 1.52 | Dor 83 |
| 1.338 | | | 0.669 | | | | | | | | 1.2 | Jaq 99 |
| 0.710 | | | 0.355 | | | 43.75 | | | | | | Bre 04a |
| 1.064 | 1.760 | 1.688 | 0.532 | 1.780 | 1.705 | 30.08 | 44.36 | | | | | Tu 00 |
| 1.062 | | | 0.531 | | | 30.08 | | | | | | Bre 01 |
| 1.338 | | | 0.669 | | | 27.8 | | | | | | Bre 04b |

TABLE 2

| λ1 μm | λ2 μm | SFG λ3 μm | Type I Angle ° | Type II Angle ° | Type I $d_{eff}$ pm/V | Type II $d_{eff}$ pm/V | Type I Angle acceptance mrad cm | Type II Angle acceptance mrad cm | Ref. |
|---|---|---|---|---|---|---|---|---|---|
| 1.064 | 0.532 | 0.355 | 41 | 62 | | | 0.33 | 0.51 | Dor 83 |
| 1.062 | 0.807 | 0.459 | 35 | | | | | | Jaq 98 |
| 1.338 | 0.750 | 0.480 | 30.8 | | | | | | Jaq 99 |
| 1.062 | 0.588 | 0.379 | 38.2 | | | | | | Bre02 |
| 1.062 | 0.748 | 0.439 | 35 | | | | | | Bre01 |
| 1.317 | 1.062 | 0.588 | 27.3 | | | | | | Bre02 |

Based on the values derived from the literature items in Tables 1 and 2 that gives a picture of the NLO properties of YAB and $RE_xY_{1-x}Al_3(BO_3)_4$ crystals, which has many gaps.

Before answering the question as to whether those crystals represent a possible supplement to BBO, LBO and CLBO for applications in the blue and UV range and which NLO parameters have to be taken into account in the production of YAB and $RE_xY_{1-x}Al_3(BO_3)_4$ crystals to obtain commercially useable NLO components, the relevant patent literature will firstly also be evaluated in respect of YAB and $RE_xY_{1-x}Al_3(BO_3)_4$.

RELATED ART

Patent Literature

U.S. Pat. No. 5,030,851 "$RE_xY_{1-x}Al_3(BO_3)_4$ crystals in electro-optic and nonlinear devices"
US patent application US 2006/0054864 A1 "Method and Structure for Nonlinear Optics"
U.S. Pat. No. 5,030,851 (1991)

This document proposes using NYAB in such a way that laser effect and production of the harmonic wavelengths occur in separate crystals: NYAB is used as a normal, stand-alone NLO crystal and the Nd ions are no longer required as they lead to unwanted absorption effects. It is therefore proposed that YAB crystals be used for frequency doubling. That document does not include any more precise information about phase adaptability of NYAB and YAB for shorter wavelengths (than 1.06 μm). There is also no reference to the angle dependency of the NLO coefficients.

The uses of YAB and crystals from the $A_xM_{1-x}X_3(BO_3)_4$ family for the production of UV radiation is also not mentioned.

US 2006/0054864 A1

That document describes the crystal growth of $A_xM_{1-x}Al_3B_4O_{12}$ by means of high temperature solvents which permit greatly reduced contamination with effects which are disadvantageous in regard to transmission in the UV wavelength range.

The available scientific and patent literature permits the following conclusions to be drawn:
  the NLO properties of the self-doublers NYAB, NGAB and YbYAB are investigated in a restricted scope. The measured and calculated parameters involve numerous inconsistencies starting with the important parameter of phase adaptation angle.
  the NLO properties of undoped crystals such as YAB, GAB, LuAB and $RE_xY_{1-x}Al_3(BO_3)_4$ are substantially unknown in the literature. U.S. Pat. No. 5,030,851 only mentions wavelengths outside the blue or ultraviolet range.
  the advantages of $RE_xY_{1-x}Al_3(BO_3)_4$ crystals which, by virtue of their mechanical and chemical properties, can be sawn, ground, polished, cleaned and coated with conventional material treatment procedures have hitherto not been investigated.

BRIEF DESCRIPTION OF THE DRAWINGS

FIG. 1 illustrates the definitions of the phase adaptation angles or orientation angles.

DESCRIPTION OF THE INVENTION

Taking the described state of the art as the basic starting point therefore the object of the invention is to provide a novel method of producing blue or ultraviolet laser light. A further object of the invention is to provide a crystal with which blue or ultraviolet laser light can be produced and which has low moisture sensitivity, high transparency and a very high destruction threshold as well as favorable mechanical and chemical properties and is therefore suitable for industrial manufacture.

That object is attained in that a crystal of the family $A_xM_{1-x}X_3(BO_3)_4$ is used as a non-linear optical element to produce light of a wavelength of less than 0.450 μm. In that case both A and also M stand for an element from the group Y, La, Ce, Pr, Nd, Pm, Sm, Eu, Gd, Tb, Dy, Ho, Er, Tm, Yb and Lu, wherein however A≠M and X=Al, Ga, Sc and $0 \leq x \leq 1$.

The stated crystal family $A_xM_{1-x}X_3(BO_3)_4$ also includes as members thereof known crystals such as $Nd_xY_{1-x}Al_3(BO_3)_4$ (abbreviated as NYAB), $Yb_xY_{1-x}Al_3(BO_3)_4$ (YbYAB) and $Nd_xGd_{1-x}Ga_3(BO_3)_4$ (NGAB).

In a preferred embodiment our invention permits the use of various $A_xM_{1-x}X_3(BO_3)_4$ crystals as independent NLO crystals for frequency conversion by frequency doubling (SHG for second harmonic generation), frequency tripling (THG for third harmonic generation), sum frequency generation (SFG), and so forth. The use of the crystals $YAl_3(BO_3)_4$ (abbreviated as YAB), $GdAl_3(BO_3)_4$ (abbreviated as GAB) and $LuAl_3(BO_3)_4$ (abbreviated as LuAB) is particularly preferred. Mixed crystals such as for example $Y_xLu_{1-x}Al_3(BO_3)_4$ (abbreviated as LuYAB) can also be of interest.

The object of the present invention is to provide a method of producing important components for various lasers with short wavelengths (below 450 nm), which has substantial technical and economic advantages over the known NLO methods. That object is based on the NLO properties of $A_xM_{1-x}X_3(BO_3)_4$ with A=Y, La, rare earths, M=Y, La, rare earths, X=Al, Ga, Sc, 0<x<1 or x=0 or x=1) crystals. That permits the production of laser beams of wavelengths 360, 355, 349, 270, 266, 262 nm (by tripling and quadrupling the frequency of the fundamental wave of for example an Nd laser), between 326 and 353, between 250 and 265 nm (by tripling and quadrupling of the frequency of for example a Yb laser), 360.5 +/−2, 320 +/−2, 303.5 +/−2, 261.5 +/−2 nm (by frequency doubling of for example a Pr laser), with frequency doubler crystals which unlike previously used materials (for example BBO or CLBO) have favorable mechanical and chemical properties and are therefore suitable for an industrial manufacture. The list of the possible wavelengths which can be achieved is not limited to the aforementioned selection and can be expanded without any problem to further fundamental wavelengths of for example semiconductor laser diodes or fiber lasers. The properties of these novel frequency conversion materials are now described by reference to some examples.

The NLO crystals $A_xM_{1-x}X_3(BO_3)_4$ (with A=Y, La, rare earths, M=Y, La, rare earths and X=Al, Ga, Sc, 0<x<1 or x=0 or x=1) are materials with extraordinary properties for NLO applications in the UV wavelength range and with mechanical and chemical properties which are extraordinary for UV NLO materials (hardness, stability, insensitivity to moisture). Accordingly $A_xM_{1-x}X_3(BO_3)_4$ crystals can be processed inexpensively and with conventional optical polishing procedures.

$A_xM_{1-x}X_3(BO_3)_4$ belong to the space group R32 and have a trigonal unit cell with lattice constants a=0.925-0.979 and c=0.718-0.795 nm depending on the respective composition. The axes of the optical ellipsoid are so defined that X=a and Z=c (Y is thus afforded automatically). The orientation that the propagation direction has in an NLO sample is described in the XYZ system by means of two polar angles Phi (in the XY plane, starting from X) and Theta (in the plane of Z and projection of the direction onto the XY plane, starting from Z).

It has been found that $A_xM_{1-x}X_3(BO_3)_4$ crystals afford numerous phase adaptation possibilities which can be used for the production of UV light. All the above-mentioned and other wavelengths between 0.250 and 0.360 μm can be produced. The NLO coefficients for that wavelength are in the range >0.30 pm/V. Contrary to assertions in the literature however those crystals cannot be efficiently phase-adapted over the entire transmission range. The shortest phase-adaptable wavelength theoretically occurs at about 0.491 μm (which would correspond to frequency-doubled UV light at 0.245 μm), but the corresponding $d_{\mathit{eff}}$ coefficient is greater than 0.30 pm/V only at wavelengths above 0.498 μm.

To produce blue or ultraviolet light with the described crystal family it is necessary to suitably adapt the crystal.

The simplest possible way of passing an electromagnetic wave through the crystal is to direct the electromagnetic wave in the normal direction, that is to say perpendicularly onto a crystal end face (normal incidence). For that purpose according to the invention the crystal has at least two substantially flat end faces, wherein one of the end faces is oriented relative to the crystallographic axes in such a way that with normal incidence of an electromagnetic wave or two electromagnetic waves of different wavelengths onto that end face, by virtue of a non-linear optical effect, an electromagnetic wave of a wavelength of less than 0.450 μm is produced. Particularly preferably the crystal end face is perpendicular to the preferred propagation direction defined in Tables 3 through 5.

Alternatively thereto the crystal has at least one end face which is oriented relative to the crystallographic axes in such a way that, upon the incidence of an electromagnetic wave or two electromagnetic waves of different wavelengths onto that end face, at the Brewster angle, by virtue of a non-linear optical effect, an electromagnetic wave of a wavelength of less 0.450 μm is produced.

More specifically if light is directed onto the crystal end face at the Brewster angle the light components with a polarization parallel to the plane of incidence are not reflected but transmitted without losses worth mentioning.

The particularly preferred embodiments are disclosed in the following examples in the cases SHG type I, SHG type II, THG and SFG type I, THG and SFG type II, and the corresponding parameters are so represented that NLO components can be readily produced, with crystals $A_xM_{1-x}X_3(BO_3)_4$.

EXAMPLES

Example A

SHG With YAB

A particularly preferred possible way of producing blue or ultraviolet light involves the use of a YAB crystal. An electromagnetic wave of the wavelength λ is passed through the crystal. In that case the crystal is used to produce the second harmonic (0.5λ), that is to say to produce an electromagnetic wave of half the wavelength.

In that case an electromagnetic wave of the wavelength λ is advantageously passed through the crystal in such a way that the propagation direction includes an angle θ with the optical Z-axis and an angle φ with the optical X-axis so that the crystal is used to produce the second harmonic of the wavelength 0.5λ.

Table 3 summarizes preferred values for the parameters λ, θ, φ and 0.5λ. The parameters respectively assume the values of a line in the Table, in preferred embodiments.

TABLE 3

| λ μm | SHG λ/2 μm | Type I θ° | Type II θ° | Type I φ° | Type II φ° |
|---|---|---|---|---|---|
| 0.492 | 0.246 | 85.4 | | 0 | |
| 0.502 | 0.251 | 77.1 | | 0 | |
| 0.532 | 0.266 | 66.2 | | 0 | |
| 0.622 | 0.311 | 51.1 | | 0 | |
| 0.742 | 0.371 | 41.2 | 65.6 | 0 | 30 |
| 0.802 | 0.401 | 38.1 | 58.3 | 0 | 30 |
| 0.912 | 0.456 | 34.0 | 50.3 | 0 | 30 |
| 0.942 | 0.471 | 33.2 | 48.8 | 0 | 30 |

In that respect a distinction is drawn between type I and type II.

In the case of type I for example an electromagnetic wave of the wavelength 0.742 μm is passed through the crystal in such a way that the propagation direction includes an angle of 41.2° with the optical Z-axis and an angle of 0° with the optical X-axis so that the crystal is used to produce the second harmonic of the wavelength 0.371 μm.

In the case of type II for example an electromagnetic wave of the wavelength 0.742 μm is passed through the crystal in such a way that the propagation direction includes an angle of 65.6° with the optical Z-axis and an angle of 30° with the optical X-axis so that the crystal is used to produce the second harmonic of the wavelength 0.371 μm.

Example B

THG With YAB

A further particularly preferred possible way of producing blue or ultraviolet light also involves the use of a YAB crystal. An electromagnetic wave of the wavelength λ is passed through the crystal. In that case the crystal is used to produce the third harmonic (1/3λ), that is to say to produce an electromagnetic wave of a wavelength which is shorter by the factor of 1/3 (frequency tripling).

In that case an electromagnetic wave of the wavelength λ is advantageously passed through the crystal in such a way that the propagation direction includes an angle θ with the optical Z-axis and an angle φ with the optical X-axis so that the crystal is used to produce the second harmonic of the wavelength 1/3λ.

Table 4 summarizes preferred values for the parameters λ, θ, φ and 1/3λ. In preferred embodiments the parameters respectively assume the values of a line in the Table. As in this case an electromagnetic wave of double the frequency or half of the wavelength is also produced, which however is at least partially absorbed by the crystal again to produce the electromagnetic wave of the wavelength 1/3λ, the wavelength λ/2 is also specified for the sake of completeness.

TABLE 4

| λ1 μm | λ/2 μm | THG λ/3 μm | Type I θ° | Type II θ° | Type I φ° | Type II φ° |
|---|---|---|---|---|---|---|
| 0.710 | 0.355 | 0.237 | 79.8 | | 0 | |
| 0.810 | 0.405 | 0.270 | 58.4 | | 0 | |
| 0.950 | 0.475 | 0.317 | 46.5 | 60.3 | 0 | 30 |
| 1.030 | 0.515 | 0.343 | 42.3 | 53.6 | 0 | 30 |
| 1.060 | 0.530 | 0.353 | 41.0 | 51.6 | 0 | 30 |
| 1.340 | 0.670 | 0.447 | 33.2 | 40.7 | 0 | 30 |

In this case also a distinction is drawn between type I and type II, as in Example A.

Example C

SFG With YAB

Still a further particularly preferred possible way of producing blue or ultraviolet light also involves the use of a YAB crystal. Here a first electromagnetic wave of the wavelength $\lambda_1$ and a second electromagnetic wave of the wavelength $\lambda_2$ is passed through the crystal in such a way that the propagation direction includes an angle θ with the optical Z-axis and an angle φ with the optical X-axis, and the crystal is used to produce an electromagnetic wave of the wavelength $\lambda_3 = \lambda_1 \cdot \lambda_2 / (\lambda_1 + \lambda_2)$. The crystal is therefore used to produce an electromagnetic wave at a frequency corresponding to the sum of the frequencies of the irradiated waves.

Alternatively thereto a first electromagnetic wave of the wavelength $\lambda_3$ and a second electromagnetic wave of the wavelength $\lambda_2$ can also be passed through the crystal in such a way that the propagation direction includes an angle θ+/−Δθ with the optical Z-axis and an angle Φ +/−ΔΦ with the optical X-axis, and the crystal is used to produce an electromagnetic wave of the wavelength $\lambda_1 = \lambda_2 \cdot \lambda_3 / (\lambda_2 - \lambda_3)$. The crystal is therefore used to produce an electromagnetic wave of a frequency corresponding to the difference in the frequencies of the irradiated waves.

Finally it is also possible to pass an electromagnetic wave at the frequency $\lambda_3$ through the crystal in such a way that the propagation direction includes an angle θ+/−Δθ with the optical Z-axis and an angle φ+/−Δφ with the optical X-axis and the crystal is used to produce an electromagnetic wave of the wavelength $\lambda_1$ and an electromagnetic wave of the wavelength $\lambda_2$. The crystal is therefore used for a parametric process which involves producing from an irradiated electromagnetic wave two electromagnetic waves of another frequency, the frequency of the irradiated wave being the sum of the frequencies of the waves produced.

Table 5 summarizes preferred values for the parameters $\lambda_1$, $\lambda_2$, $\lambda_3$, θ, φ. In preferred embodiments the parameters assume the values of a respective line in the Table.

TABLE 5

| $\lambda_1$ (μm) +/−0.015 | $\lambda_2$ (μm) +/−0.015 | $\lambda_3$ (μm) +/−0.010 | Type I Theta (°) +/−3.0° | Δθ (°) | φ (°) | Δφ (°) |
|---|---|---|---|---|---|---|
| 1.344 | 0.881 | 0.532 | 30.5 | 3.0 | 0 | 5 |
| 1.554 | 0.809 | 0.532 | 30.2 | 3.0 | 0 | 5 |
| 0.810 | 0.632 | 0.355 | 42.9 | 3.0 | 0 | 5 |
| 1.064 | 0.532 | 0.355 | 40.8 | 3.0 | 0 | 5 |
| 0.642 | 0.454 | 0.266 | 64.5 | 3.0 | 0 | 5 |
| 0.722 | 0.421 | 0.266 | 62.2 | 3.0 | 0 | 5 |
| 0.812 | 0.396 | 0.266 | 59.6 | 3.0 | 0 | 5 |
| 0.982 | 0.365 | 0.266 | 55.1 | 3.0 | 0 | 5 |
| 1.062 | 0.355 | 0.266 | 53.3 | 3.0 | 0 | 5 |
| 1.342 | 0.332 | 0.266 | 48.0 | 3.0 | 0 | 5 |
| 1.064 | 0.266 | 0.213 | 72.1 | 3.0 | 0 | 5 |

TABLE 5-continued

| λ₁ (μm) +/−0.015 | λ₂ (μm) +/−0.015 | λ₃ (μm) +/−0.010 | Type I Theta (°) +/−3.0° | Δθ (°) | φ (°) | Δφ (°) |
|---|---|---|---|---|---|---|
| 1.326 | 0.254 | 0.213 | 61.5 | 3.0 | 0 | 5 |
| 0.720 | 0.355 | 0.238 | 77.8 | 3.0 | 0 | 5 |
| 0.720 | 0.520 | 0.302 | 52.4 | 3.0 | 0 | 5 |
| 0.910 | 0.720 | 0.402 | 37.7 | 3.0 | 0 | 5 |
| 0.910 | 0.808 | 0.428 | 35.8 | 3.0 | 0 | 5 |
| 1.064 | 0.532 | 0.355 | 40.8 | 3.0 | 0 | 5 |
| 1.062 | 0.589 | 0.379 | 38.7 | 3.0 | 0 | 5 |
| 1.062 | 0.751 | 0.440 | 34.6 | 3.0 | 0 | 5 |
| 1.062 | 0.808 | 0.459 | 33.6 | 3.0 | 0 | 5 |
| 1.338 | 0.749 | 0.480 | 32.0 | 3.0 | 0 | 5 |
| 1.338 | 0.806 | 0.503 | 31.2 | 3.0 | 0 | 5 |
| 1.344 | 0.881 | 0.532 | 39.2 | 2.5 | 30 | 5 |
| 1.554 | 0.809 | 0.532 | 36.8 | 2.5 | 30 | 5 |
| 0.810 | 0.632 | 0.355 | 62.6 | 2.5 | 30 | 5 |
| 1.064 | 0.532 | 0.355 | 51.5 | 2.5 | 30 | 5 |
| 0.982 | 0.365 | 0.266 | 70.0 | 2.5 | 30 | 5 |
| 1.062 | 0.355 | 0.266 | 64.9 | 2.5 | 30 | 5 |
| 1.342 | 0.332 | 0.266 | 54.4 | 2.5 | 30 | 5 |
| 1.326 | 0.254 | 0.213 | 69.9 | 2.5 | 30 | 5 |
| 0.910 | 0.720 | 0.402 | 53.0 | 2.5 | 30 | 5 |
| 0.910 | 0.808 | 0.428 | 51.5 | 2.5 | 30 | 5 |
| 1.064 | 0.532 | 0.355 | 51.4 | 2.5 | 30 | 5 |
| 1.062 | 0.589 | 0.379 | 49.5 | 2.5 | 30 | 5 |
| 1.062 | 0.751 | 0.440 | 46.2 | 2.5 | 30 | 5 |
| 1.062 | 0.806 | 0.459 | 45.6 | 2.5 | 30 | 5 |
| 1.338 | 0.749 | 0.480 | 39.9 | 2.5 | 30 | 5 |
| 1.338 | 0.806 | 0.503 | 39.5 | 2.5 | 30 | 5 |
| 1.344 | 0.881 | 0.532 | 51.7 | 2.5 | 30 | 5 |
| 1.554 | 0.809 | 0.532 | 57.0 | 2.5 | 30 | 5 |
| 0.910 | 0.720 | 0.402 | 64.2 | 2.5 | 30 | 5 |
| 0.910 | 0.808 | 0.428 | 56.3 | 2.5 | 30 | 5 |
| 1.062 | 0.751 | 0.440 | 59.5 | 2.5 | 30 | 5 |
| 1.062 | 0.808 | 0.459 | 55.2 | 2.5 | 30 | 5 |
| 1.338 | 0.749 | 0.480 | 59.7 | 2.5 | 30 | 5 |
| 1.338 | 0.806 | 0.503 | 55.6 | 2.5 | 30 | 5 |

References

| Bar 97 | J. Bartschke, *Dissertation D386*, Universitat Kaiserslautern (1997). |
|---|---|
| Bar 97b | J. Bartschke et al., *J. Opt. Soc. Am. B 14* (1997) 3452 (NYAB with 4% Nd). |
| Bre 01 | A. Brenier et al., *J. Opt. Soc. Am. B 18* (2001) 1104 (NGAB with 3% Nd). |
| Bre 01 | A. Brenier et al., *J. Opt. Soc. Am. B 18* (2001) 1104 (NGAB). |
| Bre 02 | A. Brenier et al., *Opt. Lett. 27* (2002) 240 (NGAB with 3% Nd). |
| Bre 04a | A. Brenier et al., *Appl. Phys. Lett. 84* (2004) 16 (NGAB). |
| Bre 04b | A. Brenier et al., *Appl. Phys. Lett. 84* (2004) 2034 (NGAB with 3% Nd). |
| Dek 03 | P. Dekker et al., *J. Opt. Soc. Am. B 20* (2003) 706 and literature references (YbYAB with 10% Yb). |
| Dek 04 | P. Dekker and J.M. Dawes, *Opt. Express 12* (2004) 5922 (YbYAB with 10% Yb). |
| Dor 81 | L.M. Dorozhkin et al., *Soy. Tech. Phys. Lett. 7* (1981) 555 (NYAB with 20% Nd). |
| Dor 83 | L.M. Dorozhkin et al., *Soy. J. Quantum Electron. 13* (1983) 978 (NYAB with 20% Nd). |
| Dor 83 | L.M. Dorozhkin et al., *Soy. J. Quantum Electron. 13* (1983) 978 (NYAB with 20% Nd). |
| Eim 87 | D. Eimerl et al., *J. Appl. Phys. 62* (1987) 1968 |
| Fan 92 | Y.X. Fan et al., *OSA Proc. on ASSL 13* (1992) 371 (NYAB with 4% Nd). |
| Ger 03 | D.C. Gerstenberger et al., *Opt. Lett 28* (2003) 1242 |
| Hwa 93 | Ming-Yi Hwang and J.T. Lin, *Opt. Comm. 95* (1993) 103 (NYAB with 4% Nd). |
| Jaq 98 | D. Jaque et al., *J. Opt. Soc. Am. B 15* (1998) 1656 (NYAB with 5.6% Nd). |
| Jaq 98 | D. Jaque et al., *Appl. Phys. Lett. 73* (1998) 3659 (NYAB with 5.6% Nd). |
| Jaq 99 | D. Jaque et al., *Appl. Phys. Lett. 74* (1999) 1788 (NYAB with 5.6% Nd). |
| Jaq 99 | D. Jaque et al., *Appl. Phys. Lett. 75* (1999) 325 (NYAB with 5.6% Nd). |
| Lu 86 | Bao-sheng Lu et al., *Chin. Phys. Lett. 3* (1986) 411. |
| Lu 89 | Bao-sheng Lu et al., *J. Appl. Phys. 66* (1989) 6052 (NYAB with 10% Nd). |
| Luo 89 | Z.D. Luo et al., *SPIE Vol. 1104* (1989) 132 (NYAB with 4-8% Nd). |
| Luo 89b | Data from Luo 89, used as a calculation basis in this work. |
| Nik 03 | D.N. Nikogosyan, *"Nonlinear Crystals: a Complete Survey"*, Springer (2003). |
| Pel 06 | M. Peitz et al., *Appl. Phys.* (2006). |
| Sch 90 | I. Schutz et al., *Opt. Comm. 77* (1990) 221 (based on information from data sheets of a commercial source for NYAB). |
| Tu 00 | Chaoyang Tu et al., *J. Crystal Growth 208* (2000) 487 (NGAB with 5% Nd in solution). |
| Unt 91 | U.S. Pat. No. 5,030,851 (YAB). |

The invention claimed is:

1. A method of producing ultraviolet light characterized in that a crystal of the family $A_xM_{1-x}X_3(BO_3)_4$, wherein both A and also M stand for an element from the group Y, La, Ce, Pr, Nd, Pm, Sm, Eu, Gd, Tb, Dy, Ho, Er, Tm, Yb and Lu, A≠M and X is selected from the group consisting of Al, Ga, and Sc and $0 \leq x \leq 1$, is used as a non-linear optical element to produce light of a wavelength of less than 0.360 μm, and wherein an electromagnetic wave of the wavelength λ is passed through the crystal in such a way that the propagation direction includes the angle θ+/−Δθ with the optical axis Z and the angle φ+/−Δφ with the optical axis X and the crystal is used to produce the second harmonic of the wavelength 0.5λ, wherein λ, θ, Δθ, φ, Δφ and 0.5λ assume the values of a line in the following Table:

| λ (μm) | 0.5 λ (μm) +/− 0.001 | θ(°) | Δθ(°) | φ(°) | Δφ(°) |
|---|---|---|---|---|---|
| 0.498 +/− 0.002 | 0.249 | 79.58 | 2.50 | 0 | 1.5 |
| 0.502 +/− 0.002 | 0.251 | 77.13 | 2.00 | 0 | 1.5 |
| 0.506 +/− 0.002 | 0.253 | 75.10 | 2.00 | 0 | 1.5 |
| 0.510 +/− 0.002 | 0.255 | 73.35 | 2.00 | 0 | 1.5 |
| 0.514 +/− 0.002 | 0.257 | 71.79 | 1.50 | 0 | 1.5 |
| 0.519 +/− 0.002 | 0.2595 | 70.04 | 1.50 | 0 | 1.5 |
| 0.523 +/− 0.002 | 0.2615 | 68.77 | 1.50 | 0 | 1.5 |
| 0.527 +/− 0.002 | 0.2635 | 67.60 | 1.50 | 0 | 1.5 |
| 0.531 +/− 0.002 | 0.2655 | 66.49 | 1.50 | 0 | 1.5 |
| 0.535 +/− 0.002 | 0.2675 | 65.46 | 1.00 | 0 | 1.5 |
| 0.540 +/− 0.002 | 0.270 | 64.24 | 1.00 | 0 | 1.5 |
| 0.545 +/− 0.002 | 0.2725 | 63.11 | 1.00 | 0 | 1.5 |
| 0.550 +/− 0.002 | 0.275 | 62.04 | 1.00 | 0 | 1.5 |
| 0.560 +/− 0.002 | 0.280 | 60.07 | 1.00 | 0 | 1.5 |
| 0.570 +/− 0.002 | 0.285 | 58.30 | 1.00 | 0 | 1.5 |
| 0.580 +/− 0.002 | 0.290 | 56.68 | 1.00 | 0 | 1.5 |
| 0.590 +/− 0.002 | 0.295 | 55.19 | 1.00 | 0 | 1.5 |
| 0.600 +/− 0.002 | 0.300 | 53.81 | 1.00 | 0 | 1.5 |
| 0.604 +/− 0.002 | 0.302 | 53.29 | 1.00 | 0 | 1.5 |
| 0.608 +/− 0.002 | 0.304 | 52.78 | 1.00 | 0 | 1.5 |
| 0.612 +/− 0.002 | 0.306 | 52.29 | 0.75 | 0 | 1.5 |
| 0.636 +/− 0.002 | 0.318 | 49.59 | 0.75 | 0 | 1.5 |
| 0.640 +/− 0.002 | 0.320 | 49.18 | 0.75 | 0 | 1.5 |
| 0.644 +/− 0.002 | 0.322 | 48.78 | 0.75 | 0 | 1.5 |

2. A method as set forth in 1 characterized in that $YAl_3(BO_3)_4$, $GdAl_3(BO_3)_4$, $YbAl_3(BO_3)_4$, or $LuAl_3(BO_3)_4$ is used as the crystal.

3. Use of a crystal of the family $A_xM_{1-x}X_3(BO_3)_4$ as a non-linear optical element in a method according to any one of claims 1 and 2 to produce light of a wavelength of less than 0.360 μm, wherein both A and also M stand for an element from the group Y, La, Ce, Pr, Nd, Pm, Sm, Eu, Gd, Tb, Dy, Ho, Er, Tm, Yb and Lu, A≠M and X is selected from the group consisting of Al, Ga, and Sc and $0 \leqq x \leqq 1$.

* * * * *